United States Patent
Zhang et al.

(10) Patent No.: US 10,414,392 B2
(45) Date of Patent: Sep. 17, 2019

(54) METHODS AND SYSTEM FOR DELIVERING POWERTRAIN TORQUE

(71) Applicant: Ford Global Technologies, LLC, Dearborn, MI (US)

(72) Inventors: Chen Zhang, Canton, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 236 days.

(21) Appl. No.: 15/397,505

(22) Filed: Jan. 3, 2017

(65) Prior Publication Data

US 2018/0186361 A1 Jul. 5, 2018

(51) Int. Cl.
*B60W 20/15* (2016.01)
*B60W 10/08* (2006.01)
(Continued)

(52) U.S. Cl.
CPC ........... *B60W 20/15* (2016.01); *B60L 3/0046* (2013.01); *B60L 15/2009* (2013.01); *B60L 15/2054* (2013.01); *B60L 50/15* (2019.02); *B60L 50/16* (2019.02); *B60W 10/06* (2013.01); *B60W 10/08* (2013.01); *B60W 20/10* (2013.01); *B60W 30/188* (2013.01); *B60L 2240/36* (2013.01); *B60L 2240/421* (2013.01); *B60L 2240/423* (2013.01); *B60L 2240/441* (2013.01); *B60L 2240/443* (2013.01); *B60L 2240/461* (2013.01); *B60L 2240/486* (2013.01); *B60L 2240/507* (2013.01); *B60L 2240/54* (2013.01); *B60W 2510/0657* (2013.01); *B60W 2510/083* (2013.01); *B60W 2710/0666* (2013.01); *B60W 2710/083* (2013.01); *B60W 2710/105* (2013.01); *B60W 2710/244* (2013.01);
(Continued)

(58) Field of Classification Search
CPC ...... B60W 20/10; B60W 20/12; B60W 20/15; B60W 20/19; B60W 2510/0657; B60W 2510/083; B60W 2510/105; B60W 10/06; B60W 10/08; B60W 30/188; B60W 2710/0666; B60W 2710/083; B60W 2710/105
See application file for complete search history.

(56) References Cited

U.S. PATENT DOCUMENTS 7,865,287 B2    1/2011   Huseman
8,265,815 B2    9/2012   McGrogan et al.
(Continued)

OTHER PUBLICATIONS

Davis, Marlan, "Chassis Dyno Guide—The Truth About Chassis Dynos," May 1, 2004, Hot Rod Network, https://www.hotrod.com/articles/hrdp-0405-chassis-dyno-guide/ (Year: 2004).*
(Continued)

*Primary Examiner* — Spencer D Patton
(74) *Attorney, Agent, or Firm* — David Kelley; McCoy Russell LLP (57) ABSTRACT

Systems and methods for operating a driveline of a hybrid vehicle are disclosed. In one example, powertrain output is limited or constrained so that powertrain output variation is limited to a desired level at different altitudes. The powertrain output may be constrained based on a ratio of a threshold electric machine torque to a threshold engine torque.

5 Claims, 8 Drawing Sheets

(51) Int. Cl.
  *B60W 10/06*   (2006.01)
  *B60W 30/188*  (2012.01)
  *B60W 20/10*   (2016.01)
  *B60L 3/00*    (2019.01)
  *B60L 15/20*   (2006.01)
  *B60L 50/15*   (2019.01)
  *B60L 50/16*   (2019.01)

(52) U.S. Cl.
  CPC ........ *Y02T 10/6286* (2013.01); *Y02T 10/7077* (2013.01); *Y10S 903/93* (2013.01)

(56) References Cited

U.S. PATENT DOCUMENTS

| | | |
|---|---|---|
| 9,242,641 B2 | 1/2016 | Martin et al. |
| 2013/0006456 A1 | 1/2013 | Thaduvayi et al. |
| 2016/0009270 A1 | 1/2016 | Zhang et al. |
| 2016/0200315 A1* | 7/2016 | Fracchia ................ B60K 6/448 701/22 |

OTHER PUBLICATIONS

Carotron, "Motor Control Basics: Driver Operating Modes," accessed Jun. 7, 2016, http://www.carotron.com/applications/csag-d/ (Year: 2016).*

Gao et al., "DOE Hybrid and Electric Vehicle Test Platform," Jun. 2012, Advanced Vehicle Research Center, NT-42790, https://www.osti.gov/servlets/purl/1178565 (Year: 2012).*

* cited by examiner

METHODS AND SYSTEM FOR DELIVERING POWERTRAIN TORQUE

FIELD

The present description relates to methods and a system for operating a hybrid powertrain that includes an engine and an electric machine to propel a vehicle. The methods and systems may be particularly useful for hybrid vehicles that operate at different altitudes where powertrain output may vary.

BACKGROUND AND SUMMARY

A hybrid vehicle may include an internal combustion engine and an electric machine to propel the vehicle. The engine may output a first torque at wide open throttle and a given air-fuel ratio at a constant engine speed while operating at sea level. The same engine may output a second engine torque at wide open throttle at the same air-fuel ratio at the same constant engine speed while operating at an altitude well above sea level. The first torque may be greater than the second torque because there is more oxygen available at sea level than at a higher altitude. Thus, if a human driver requests a large amount of torque at a higher altitude, powertrain output may be reduced because of reduced engine output. Electric machine output may also be subject to changes in output due to battery operating conditions and electric machine temperature. At higher altitudes, engine and electric machine output inconsistency may be exacerbated because of the coupling between the engine and the electric machine to provide a desired powertrain torque. In particular, a control system may attempt to increase electric machine output to compensate for reduced engine output at higher altitudes, but increased reliance on the electric machine may affect battery state of charge and electric machine temperature. As a result, performance of both the engine and the electric machine may be more inconsistent at higher altitude. As such, a human driving the hybrid vehicle may notice inconsistency in hybrid powertrain output, and the vehicle's driver may find the inconsistency objectionable. Therefore, it may be desirable to provide reduce hybrid vehicle powertrain inconsistency when the hybrid vehicle is operating at sea level or at a higher altitude.

The inventors herein have recognized the above-mentioned issues and have developed a powertrain operating method, comprising: receiving sensor input to a controller; and limiting powertrain output via the controller in response to a ratio of a threshold electric machine torque to a threshold engine torque.

By constraining or limiting powertrain output in response to a ratio of a threshold electric machine torque to a threshold engine torque, it may be possible to provide more consistent powertrain output at sea level and at altitude without having to reduce powertrain output to engine output at higher altitudes. For example, powertrain output may be determined to vary with electric machine and engine output. However, a ratio of threshold electric machine torque to threshold engine torque may be used as a basis for reducing inconsistency related to altitude and electric machine output. Consequently, powertrain output may be limited based on a combination of electric machine output and engine output.

The present description may provide several advantages. Specifically, the approach may reduce powertrain output differences at sea level and higher altitudes, and the benefits may be most significant when the hybrid vehicle is operated at higher altitudes. In addition, the approach may reduce powertrain output inconsistency at sea level or higher altitude without limiting powertrain output to maximum power the hybrid powertrain's engine outputs at higher altitude. Further, the approach may limit powertrain output in response to powertrain output power or powertrain torque.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
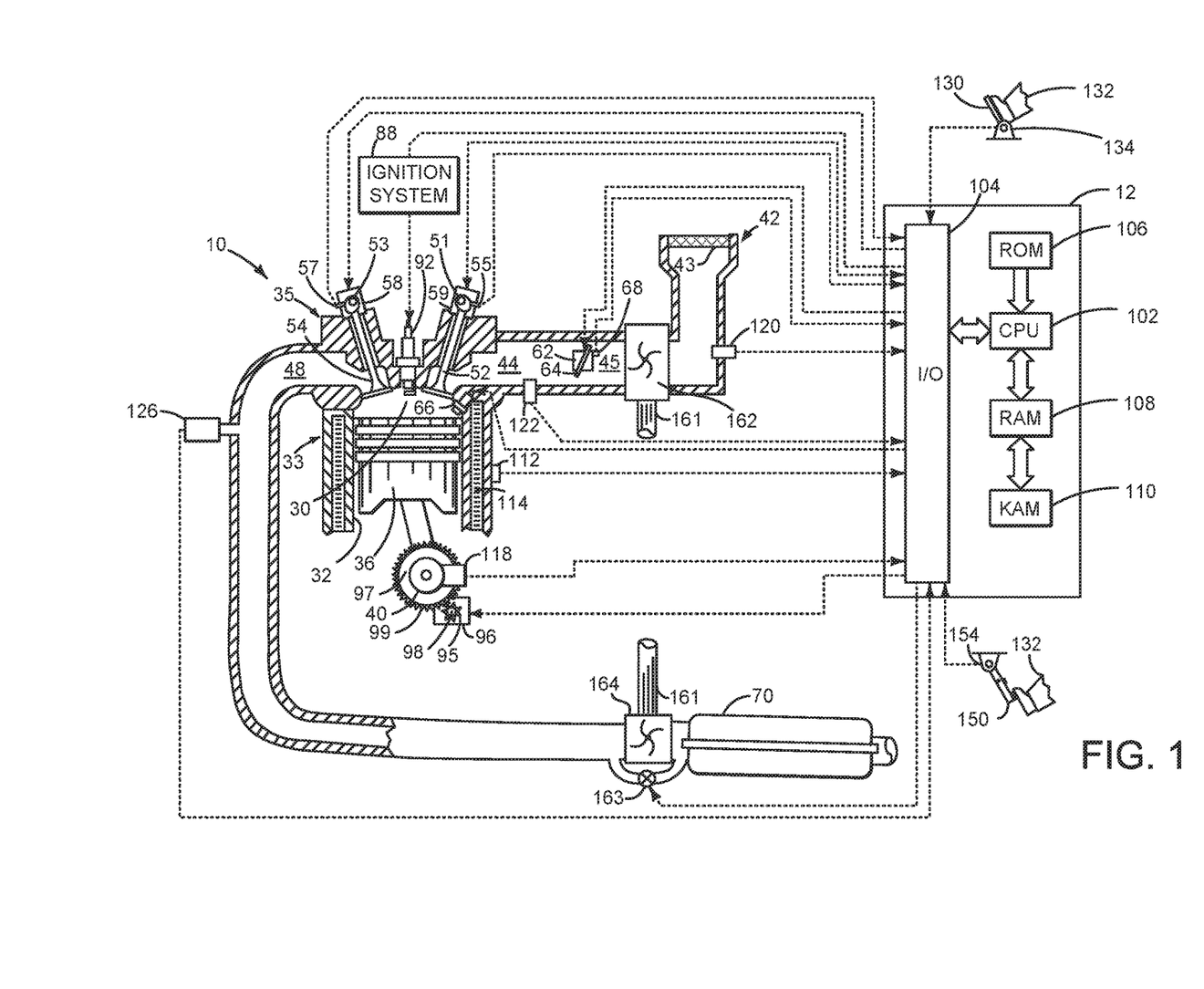
FIG. 1 is a schematic diagram of an engine.
Figure 2:
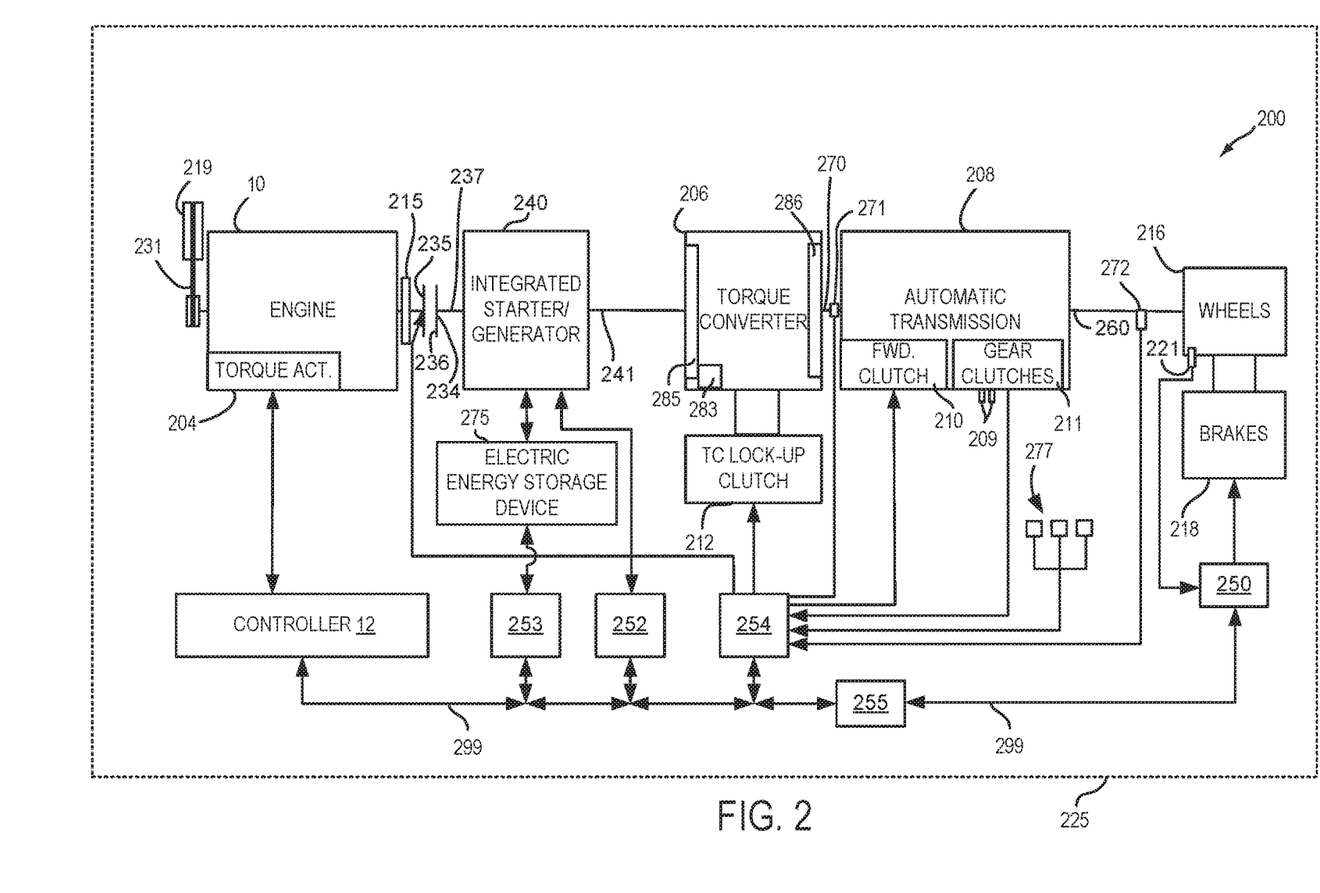
FIG. 2 is a schematic diagram of an example hybrid vehicle driveline.
Figure 3:
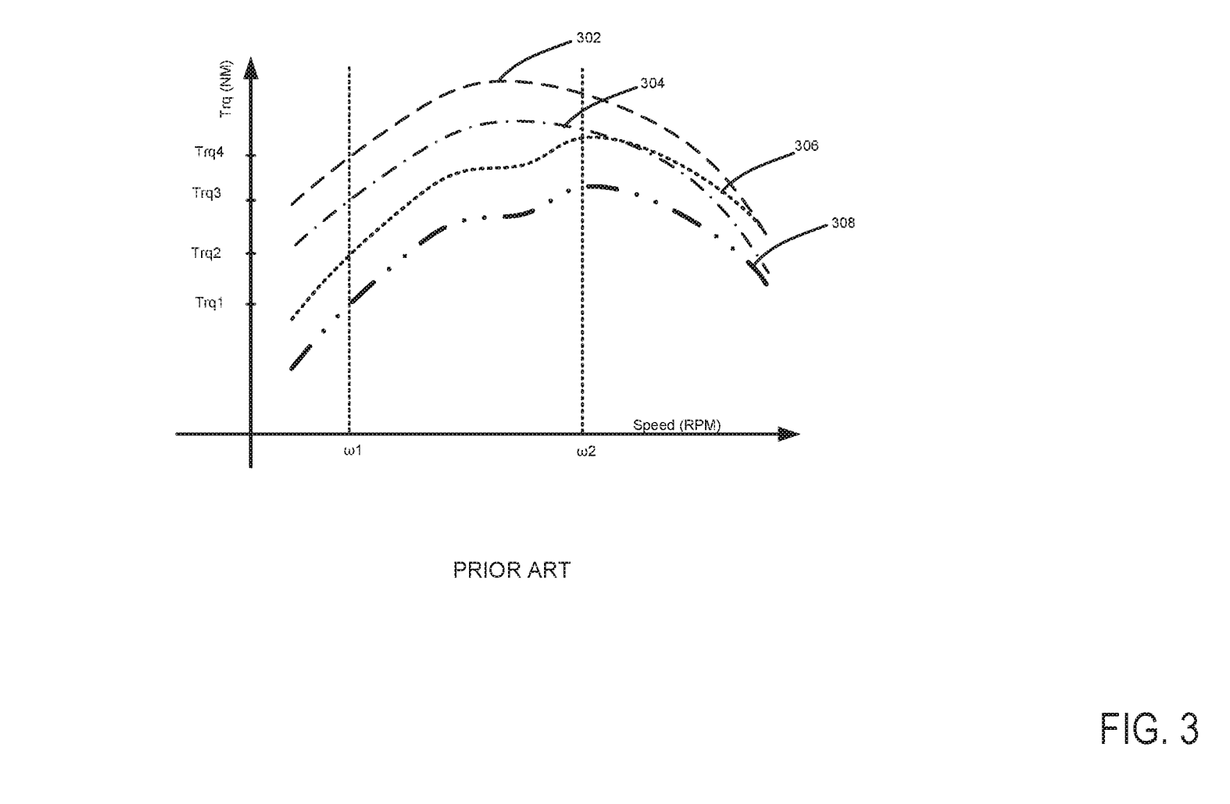
FIG. 3 is a plot showing example prior art unconstrained hybrid powertrain output.
Figure 4:
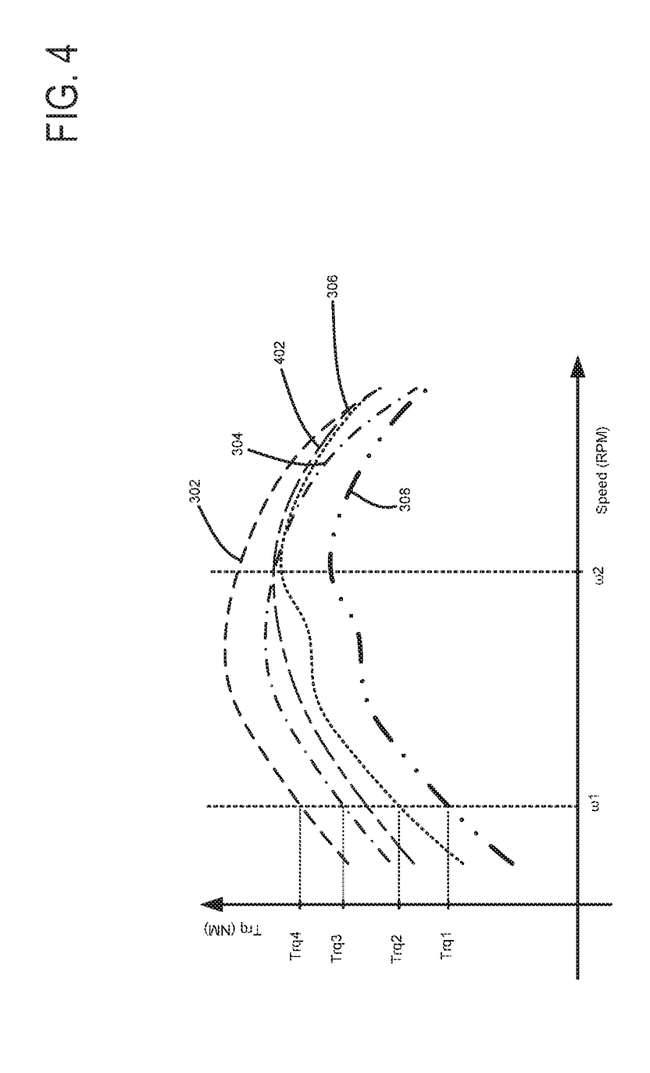
FIG. 4 is a plot showing constrained hybrid powertrain output according to the method described herein.

The present description is related to controlling output power of a hybrid powertrain that includes an engine and an electric machine. The hybrid vehicle may include an internal combustion engine as shown in FIG. 1. The internal combustion engine may be included in a driveline or powertrain of a hybrid vehicle as shown in FIG. 2. Powertrain output known in the prior art is shown in FIG. 3. A plot of exemplary powertrain output for the present method is shown in FIG. 4. FIGS. 5-8 show plots illustrating ways to constrain powertrain output so that powertrain output may be more consistent at sea level and higher altitudes. FIG. 9 shows a method for constraining powertrain output to provide more uniform powertrain output at sea level and at higher altitudes.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake camshaft 51 and an exhaust camshaft 53. The position of intake camshaft 51 may be determined by intake camshaft sensor 55. The position of exhaust camshaft 53 may be determined by exhaust camshaft sensor 57. Intake valves may be held open or closed over an entire engine cycle as the engine rotates via deactivating intake valve actuator 59, which may electrically, hydraulically, or mechanically operate intake valves. Alternatively, intake valves may be opened and closed during a cycle of the engine. Exhaust valves may be held open or closed over an entire engine cycle (e.g., two engine revolutions) as the engine rotates via deactivating exhaust valve actuator 58, which may be electrically, hydraulically, or mechanically operate exhaust valves. Alternatively, exhaust valves may be opened and closed during a cycle of the engine.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via belt driven integrated starter/generator (BISG) 219, or via driveline integrated starter/generator (ISG) 240 also known as a motor/generator. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG is mechanically coupled to engine 10 via belt 231. BISG may be coupled to crankshaft 40 or a camshaft (e.g., 51 or 53). BISG may operate as a motor when supplied with electrical power via electric energy storage device 275. BISG may operate as a generator supplying electrical power to electric energy storage device 275.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 235. ISG 240 may provide a positive torque or a negative torque to powertrain 200 via operating as a motor or generator as instructed by electric machine controller 252.

Torque converter 206 includes a turbine 286 to output torque to input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed step ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG 240 or BISG 219. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206, which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and/or engine 10, and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Engine 10 may also provide a negative torque by ceasing fuel delivery to engine cylinders. Engine cylinders may be deactivated with intake and exhaust valves opening and closing during engine rotation or with intake and exhaust valves held closed over one or more engine cycles while the engine rotates. Any portion of desired negative wheel torque that may not be provided by engine 10 and/or ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

In other examples, engine 10 may be coupled to an electric dynamometer that rotates engine 10 while it is not receiving fuel. In still other examples, engine 10 may be in communication with a motor of a parallel or series hybrid driveline. Thus, camshaft timing for a non-reference engine may be revised in different settings.

Thus, the system of FIGS. 1 and 2 provides for a system, comprising: an engine; an electric machine coupled to the engine; a transmission couple to the electric machine; and a vehicle system controller including executable instructions stored in non-transitory memory to constrain powertrain torque in response to an estimate of powertrain torque inconsistency, the powertrain torque inconsistency equal to a value of one plus a ratio. The system includes where the ratio is a ratio of a threshold electric machine torque to a threshold engine torque. The system further comprises estimating the ratio as a constant value for all powertrain speeds. The system further comprises constraining the powertrain torque to a value less than a threshold engine torque multiplied by the estimate of powertrain torque inconsistency. The system includes where the ratio is estimated as an empirically determined power divided by present powertrain speed times a threshold engine torque. The system includes where the ratio is estimated as an empirically determined threshold power divided by a threshold engine torque.

Referring now to FIG. 3, a plot showing example prior art unconstrained hybrid powertrain output is shown. The vertical axis represents powertrain torque and the horizontal axis represents powertrain speed upstream of a torque converter and gear box. The powertrain torque increases in the direction of the vertical axis arrow. The powertrain speed increases in the direction of the horizontal axis arrow. Vertical lines at ω1 and ω2 represent powertrain speeds of interest in the plot.

Dashed line 302 represents sea level maximum engine torque plus maximum electric machine or motor torque. Dashed dot line 304 represents high altitude maximum engine torque plus maximum electric machine torque. Dashed line 306 represents sea level maximum engine torque. Dashed double dot line 308 represents high altitude maximum engine torque.

It may be observed that high altitude maximum engine torque is less than sea level maximum engine torque. The maximum engine torque at sea level is greater than the maximum engine torque at higher altitudes because additional oxygen may be available to the engine at sea level.

Maximum electric machine torque is added to maximum high altitude engine torque to provide the torque indicated by line 304. However, if battery state of charge is low or the electric machine is warm, the maximum powertrain torque at high altitude may be less than the level indicated by line 304. Similarly, maximum electric machine torque is added to maximum sea level engine torque to provide the torque indicated by line 302. But, if battery state of charge is low or the electric machine is warm, the maximum powertrain torque at sea level may be less than the level indicated by line 302. Thus, the torque actually provided by the powertrain at sea level may be a torque between line 302 and line 306. The torque actually provided by the powertrain at high altitude may be a torque between line 308 and line 304.

There may be a significant difference in powertrain output power between curves 302 and 306. Likewise, there may be a significant difference in powertrain output power between curves 304 and 308. A driver of a vehicle may notice the powertrain torque difference between sea level operating conditions and high altitude operating conditions if powertrain output is not compensated. The powertrain output inconsistency may be particularly noticeable at higher altitudes where engine output inconsistency and electric machine inconsistency may be highly coupled. Therefore, it may be desirable to reduce hybrid powertrain inconsistency when the hybrid vehicle is operating at sea level or higher altitude.

Referring now to FIG. 4, a plot showing constrained hybrid powertrain output is shown. The vertical axis represents powertrain torque and the horizontal axis represents powertrain speed upstream of a torque converter and gear box. The powertrain torque increases in the direction of the vertical axis arrow. The powertrain speed increases in the direction of the horizontal axis arrow. Vertical lines at ω1 and ω2 represent powertrain speeds of interest in the plot.

Curves 302, 304, 306, and 308 are the same curves shown in FIG. 3 and represent the same powertrain outputs as described in FIG. 3. Curve 402 represents a powertrain output curve that limits powertrain output based on inconsistency of powertrain output. The inconsistency may be expressed as a ratio of allowed maximum electric machine torque (e.g., a threshold electric machine torque that is lower than a nominal motor maximum torque, without considering motor thermal or battery state of charge constraints, and may be determined by accelerator pedal application or tip-in performance enhancement from the motor) with respect to engine maximum torque. The allowed maximum electric machine torque may be different from the electric machine's available maximum torque (e.g., normal upper threshold torque from the motor (motor torque when the motor is not operating at conditions that may degrade motor torque) including battery constraints). The ratio may be expressed as:

$$r(\omega) = \frac{\text{Mot\_max\_tor}(\omega)}{\text{Eng\_max\_tor}(\omega)}$$

Variation of maximum powertrain torque can be represented as:

$$R(\omega) = 1 + r(\omega)$$

where $R(\omega)$ is powertrain torque variation coefficient and $\omega$ is engine and electric machine speed. The maximum powertrain torque may be constrained according to the following equation:

$$T_{max\_powertrain}(\omega) \leq T_{max\_eng}(\omega)(1 + r_0(\omega))$$

where $T_{max\_powertrain}$ is maximum powertrain torque or an upper threshold limited torque which powertrain torque may not exceed, $T_{max\_engine}$ is a maximum engine torque or an upper threshold limited engine torque which engine torque may not exceed, and $r_0(\omega)$ is an adjustable constant or curve that is a function of engine speed and it represents $r(\omega)$.

It may be observed that powertrain torque represented by curve 402 is less than torque represented by curves 302 and 304 for engine speeds less than ω2. Powertrain torque represented by curve 402 is also greater that torque represented by curves 306 and 308 for engine speeds less than ω2. Powertrain output torque follows curve 402 from speed ω1 to speed ω2, but after speed ω2, powertrain torque may follow curve 304. Thus, for powertrain speed greater than speed ω2, powertrain torque may be limited to maximum powertrain torque at high altitude.

A driver may experience improved consistency of powertrain torque due to preservation of battery energy so that additional battery power may be available when needed and because powertrain torque variation may be reduced at lower powertrain speeds via reducing the torque variation ratio $R(\omega)$.

The plot of FIG. 4 also includes four different torque levels along the vertical axis Trq1–Trq4. Maximum powertrain torque as a function of ω is equal to maximum engine torque as a function of ω+maximum electric machine torque as a function of ω, which equals maximum engine torque (ω) multiplied by (1+r(ω)). At sea level, maximum powertrain torque (ω1) equals Trq4, maximum engine torque equals Trq2, r(ω1)=(Trq4−Trq2)/Trq2, R(ω1)=Trq4/Trq2. At higher altitude, maximum powertrain torque (ω1) equals Trq3, maximum engine torque equals Trq1, r(ω1)=(Trq3−Trq1)/Trq1, R(ω1)=Trq3/Trq1.

Figure 5:
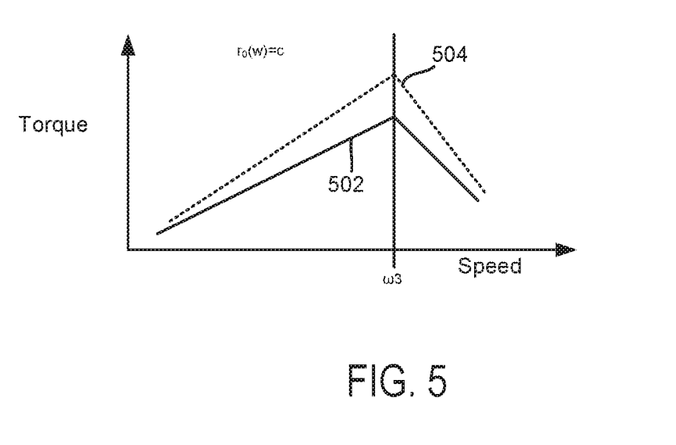
FIGS. 5-8 are plots showing methods of constraining hybrid powertrain output.

Referring now to FIG. 5, a plot of a first method for reducing inconsistency of maximum powertrain torque is shown. The vertical axis represents torque and torque increases in the direction of the vertical axis arrow. The horizontal axis represents speed and speed increases in the direction of the horizontal axis arrow.

In this example, the maximum powertrain torque curve is found by making $r_0(\omega)$ a constant for all powertrain speeds. The constant may be an estimate of the ratio $r_0(\omega)$. Engine torque as a function of engine speed is represented by solid line 502, which is simplified as a piece-wise linear function of (ω) though it may not match some actual engine torque characteristics. The maximum powertrain torque limit or threshold not to be exceeded is indicated by dashed line 504. Dashed line 504 follows closely to solid line 502 with the difference being $r_0(w)$ is a constant, and where $T_{max\_powertrain}(\omega) \leq T_{max\_eng}(\omega)(1+r_0(\omega))$. $T_{max\_powertrain}(\omega)$ (e.g., upper threshold limited powertrain torque) is represented as dashed line 504 and $T_{max\_eng}(\omega)$ (e.g., upper threshold limited engine torque) is represented as solid line 502. Thus, in this example, $$r(\omega) = \frac{\text{Mot\_max\_tor}(\omega)}{\text{Eng\_max\_tor}(\omega)}$$

is estimated as a constant, thereby constraining the maximum powertrain torque or the powertrain threshold torque based on the maximum or upper threshold engine torque plus a constant, the constant indicative of the powertrain torque inconsistency, which is defined as the ratio $$r(\omega) = \frac{\text{Mot\_max\_tor}(\omega)}{\text{Eng\_max\_tor}(\omega)}.$$

Thus, $r_0(\omega)$ may be a constant that represents the ratio of the partial of motor or electric machine torque to maximum engine torque.

Figure 6:
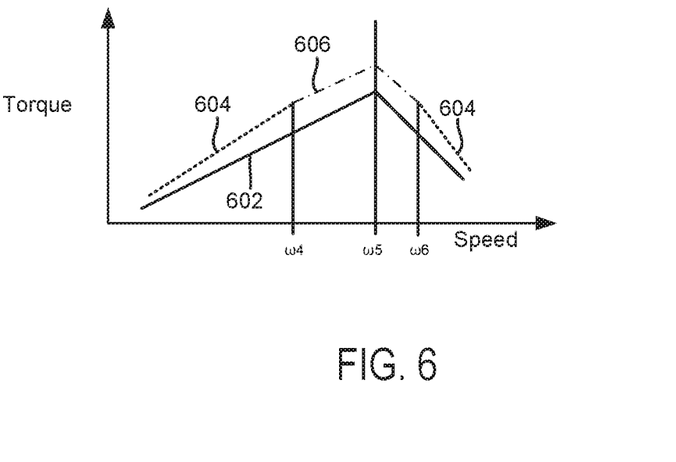

Referring now to FIG. 6, a plot of a second method for reducing inconsistency of maximum powertrain torque is shown. The vertical axis represents torque and torque increases in the direction of the vertical axis arrow. The horizontal axis represents speed and speed increases in the direction of the horizontal axis arrow.

In this example, the maximum powertrain torque curve is found by making $r_0(\omega)$ a constant for all powertrain speeds, except when $T_{max\_eng}(\omega)*c>\text{Delta\_Trq}$, where c is a constant and where Delta_trq is a maximum electric machine torque (e.g., an upper threshold electric machine torque not to be exceeded) for electric machine speed less than a threshold. Engine torque as a function of engine speed ($T_{max\_eng}(\omega)$) is represented by solid line 602, which is simplified as a piece-wise linear function of (ω) though it may not match some actual engine torque characteristics. The maximum powertrain torque limit or threshold not to be exceeded when $T_{max\_eng}(\omega)r_0(\omega) \leq \text{Delta\_Trq}$ is indicated by dashed line 604. Dashed line 604 follows closely to solid line 602 with the difference being $T_{max\_powertrain}(\omega)$ (e.g., curve 604) $\leq T_{max\_eng}(\omega)(1+r_0(\omega))$, where $r_0(\omega)$ is a constant. This condition is present for engine speeds less than ω4 and engine speeds greater than ω6. Thus, when $T_{max\_eng}(\omega)r_0(\omega) \leq \text{Delta\_Trq}$, $$r(\omega) = \frac{\text{Mot\_max\_tor}(\omega)}{\text{Eng\_max\_tor}(\omega)}$$

is estimated as a constant, thereby constraining the maximum powertrain torque or the powertrain threshold torque based on the maximum or upper threshold engine torque plus a constant, the constant indicative of the powertrain torque inconsistency, which is defined as the ratio $$r(\omega) = \frac{\text{Mot\_max\_tor}(\omega)}{\text{Eng\_max\_tor}(\omega)}.$$

Thus, $r_0(\omega)$ may be a constant that represents the ratio of the partial of motor or electric machine torque to maximum engine torque.

Dashed dot line 606 between engine speed ω4 and engine speed ω6 represents $T_{max\_powertrain}(\omega)$ when $T_{max\_eng}(\omega)*c>\text{Delta\_Trq}$. Again, engine torque as a function of engine speed ($T_{max\_eng}(\omega)$) is represented by solid line 602 between engine speed ω4 and engine speed ω6, which is simplified as a piece-wise linear function of (ω) though it may not match some actual engine torque characteristics. The maximum powertrain torque limit or threshold not to be exceeded when $T_{max\_eng}(\omega)r_0(\omega)>\text{Delta\_Trq}$ is indicated by dashed line 606. Dashed dot line 606 follows closely to solid line 602 with the difference being $T_{max\_powertrain}(\omega)$ (e.g., curve 606) $\leq T_{max\_eng}(\omega)(1+r_0(\omega))$, where $r_0(\omega)$ is Delta_Trq/$T_{max\_engine}(\omega)$. This condition is present for engine speeds greater than ω4 and engine speeds less than ω6. Thus, when $T_{max\_eng}(\omega)r_0(\omega)>\text{Delta\_Trq}$, $$r(\omega) = \frac{\text{Mot\_max\_tor}(\omega)}{\text{Eng\_max\_tor}(\omega)}$$

is estimated as Delta_Trq/$T_{max\_engine}(\omega)$, thereby constraining the maximum powertrain torque or the powertrain threshold torque based on the maximum or upper threshold engine torque plus a ratio Delta_Trq/$T_{max\_engine}(\omega)$, the ratio indicative of the powertrain torque inconsistency. Thus, $r_0(\omega)$ may be a ratio that represents the ratio of the partial of motor or electric machine torque to maximum engine torque. Limiting powertrain torque via the second method provides the advantages of limiting assistant propulsion torque from the battery and the electric machine so that the possibility of battery degradation may be reduced.

Figure 7:
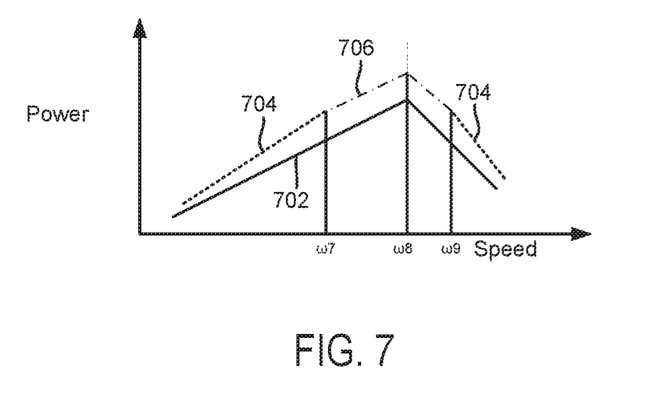

Referring now to FIG. 7, a plot of a third method for reducing inconsistency of maximum powertrain output power is shown. The vertical axis represents power and power increases in the direction of the vertical axis arrow. The horizontal axis represents speed and speed increases in the direction of the horizontal axis arrow.

In this example, the maximum powertrain power curve is found by making $r_0(\omega)=\text{Delta\_pwr}/(\omega*T_{max\_engine}(\omega))$ if Delta_pwr/(ω)≤Delta_Trq_max where Delta_pwr is a maximum propulsion power (e.g., an upper threshold electric machine power not to be exceeded) that may be provided via the electric machine and the battery, and Delta_Trq_max is a maximum electric machine torque (e.g., an upper threshold electric machine torque not to be exceeded) for electric machine speed less than a threshold. However, $r_0(\omega)=\text{Delta\_Trq\_max}/T_{max\_engine}(\omega)$ if Delta_pwr/(ω)≥Delta_Trq_max. Therefore, at powertrain speeds less than ω7 and greater than ω9, $r_0(\omega)=\text{Delta\_Trq\_max}/T_{max\_engine}(\omega)$. At powertrain speeds greater than ω7 and less than ω9, $r_0(\omega)=\text{Delta\_pwr}/(\omega*T_{max\_engine}(\omega))$. Thus, powertrain power output is limited as a function of two different $r_0$ values. Limiting powertrain power via the third method provides the advantages of limiting assistant propulsion torque provided via the electric machine and the battery so that the possibility of battery degradation may be reduced.

FIG. 7 shows the powertrain power limit when powertrain power is constrained to less than a threshold via $r_0(\omega)=\text{Delta\_Trq\_max}/T_{max\_engine}(\omega)$ is indicated by dashed line 704. The powertrain power limit when powertrain power is constrained to less than a threshold via $r_0(\omega)=\text{Delta\_pwr}/(\omega*T_{max\_engine}(\omega))$ is indicated by dashed dot line 706. Engine maximum power is indicated by solid dot line 702.

In these ways, powertrain output torque or power may be limited as a function of $r_0$, which describes powertrain torque inconsistency between sea level and altitude. Further, r0 describes the powertrain torque inconsistency that results from battery state of charge variation and change in altitude (e.g., operating the vehicle at a higher altitude).

Figure 8:
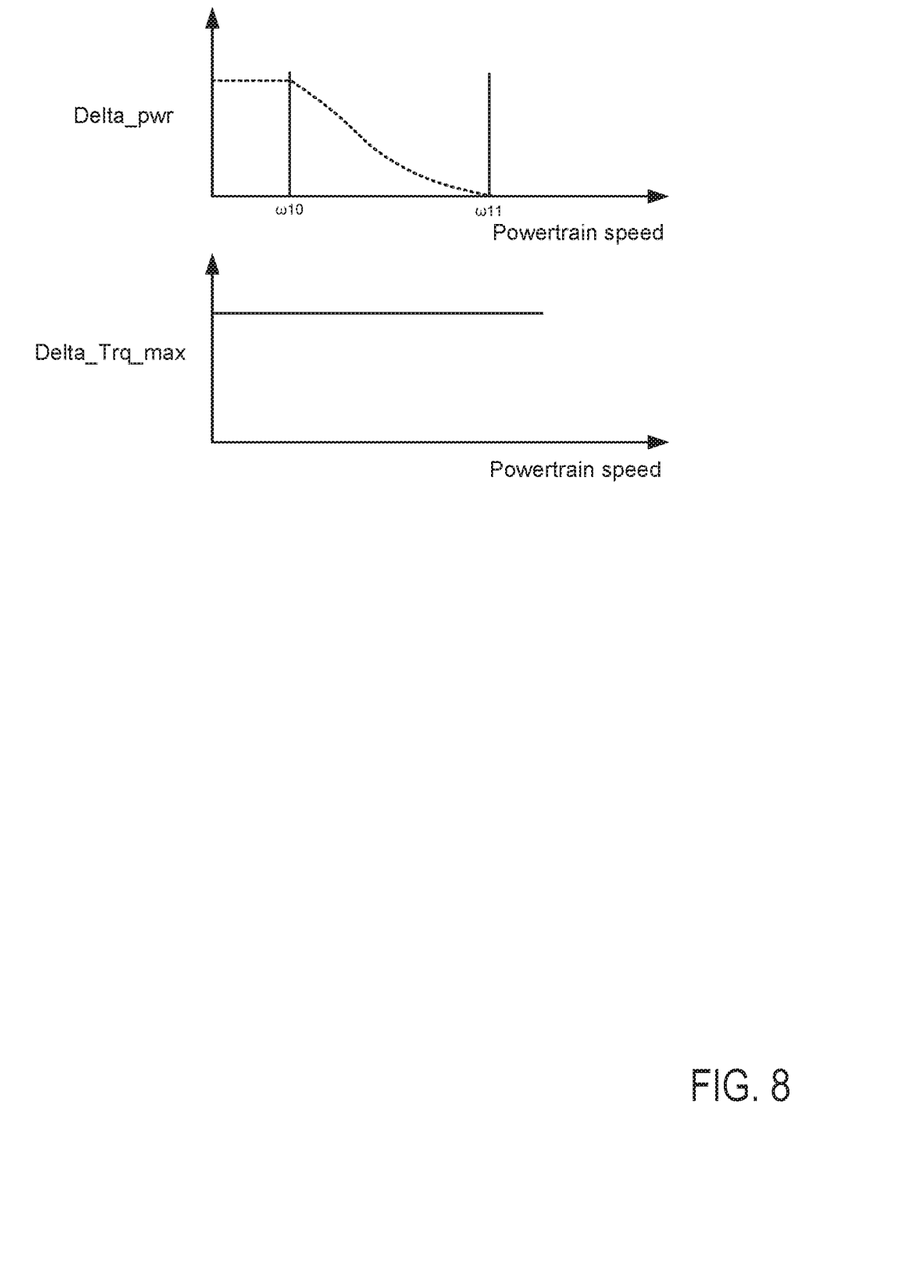
Figure 9:
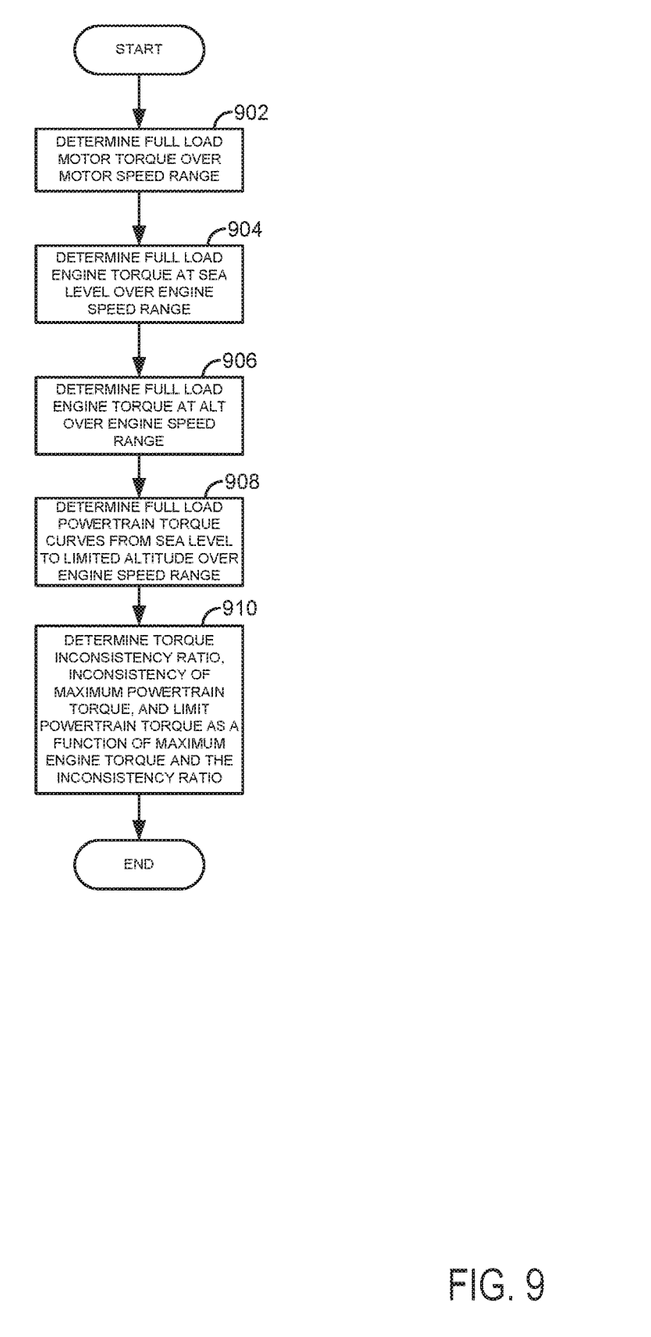
FIG. 9 is a flowchart of an example method for constraining hybrid powertrain output.

Referring now to FIG. 8, plots are shown to illustrate a fourth method for reducing powertrain output inconsistency. The first plot from the top of FIG. 8 is a plot of Delta_pwr versus powertrain speed. Delta_pwr is a maximum propulsion power that may be provided via the electric machine and the battery. The second plot from the top of FIG. 8 is a plot of Delta_Trq_max versus powertrains speed. Delta_Trq_max is a maximum electric machine torque for electric machine speed less than a threshold. Electric machine speed is the same as powertrain speed in this example.

The variable $r_0(\omega)$ may be determined from the speed dependent curve Delta_pwr as shown in the first plot from the top of FIG. 8 and constant torque Delta_Trq_max as shown in the second plot from the top of FIG. 8. Delta_pwr is constant when engine speed is less than a threshold value (e.g., ω10). Delta_pwr goes to zero at speed ω11. At speeds between ω10 and ω11, Delta_pwr monotonically decays (e.g., is reduced without increasing or being constant). For engine speeds greater than ω10, a portion of powertrain power provided by the electric machine is reduced since the engine has capacity to provide power at speed greater than ω10. For engine speeds greater than ω11, the portion of powertrain power provided by the electric machine is made zero so that energy stored in the battery may be conserved. In this way, the engine and electric machine may provide improved low speed powertrain output at different altitudes. Further, at low powertrain speeds, electric machine torque may be limited (e.g., made not to exceed) via Delta_Trq_max, and Delta_Trq_max is subject to an electric machine maximum torque constraint (e.g., upper threshold limit). In some examples, ω10 is a value between 1500 and 2500 RPM, ω11 is a value between 3500 and 5000 RPM.

In this example, $r_0(\omega)$ may be expressed as:

$$r_0(\omega) = \frac{\min\left(\frac{\text{Delta\_pwr}}{\omega}, \text{Delta\_Trq\_max}\right)}{\text{Engine\_max\_Trq}(\omega)}$$

where min selects the minimum of Delta_pwr/ω and Delta_Trq_max. The minimum is then divided by Engine_max_Trq(ω), or the maximum engine torque (e.g., threshold engine torque not to be exceeded).

Referring now to FIG. 9, a method for operating a hybrid vehicle is disclosed. The method of FIG. 9 may be incorporated into the system of FIGS. 1 and 2 as executable instructions stored in non-transitory memory. Additionally, portions of the method of FIG. 9 may be acts performed via the controller 12 shown in FIGS. 1 and 2 to transform a state of a device or actuator in the real world.

At 902, method 900 determines full load electric machine or motor torque over a speed range of the electric machine. The full load electric machine torque over the electric machine speed range may also be described as the maximum electric machine torque over the speed range or the electric machine torque threshold that is not to be exceeded. In one example, the full load electric machine torque may be empirically determined via operating the electric machine in a speed mode and increasing a load applied to the electric machine until speed of the electric machine starts to decrease. The load applied to the electric machine when the speed of the electric machine starts to decrease is the full load electric machine torque. The speed range of the electric machine may be from zero speed to a rated or maximum speed of the electric machine. Full load electric machine torque values may be determined in this way over the electric machine speed range. The electric machine operates in a speed control mode when electric machine torque is adjusted to follow a desired electric machine speed. Thus, load (e.g., a negative torque) may be applied to the motor up to a point where motor speed begins to decline to determine the full load or maximum electric machine torque. The full load electric machine torques and their corresponding speeds are saved to controller memory. Method 900 proceeds to 904 after a curve representing the full load electric machine torque is determined.

At 904, method 900 determines full engine torque at sea level over a speed range of the engine. The full load engine torque over the engine speed range may also be described as the maximum engine torque over the engine speed range or the engine torque threshold that is not to be exceeded. In one example, the full load engine torque may be empirically determined via operating the engine in a speed mode and increasing a load applied to the engine until engine speed starts to decrease while engine spark timing is advanced to knock limited spark timing (e.g., spark timing advanced to where engine knock begins) and the engine is operating at a stoichiometric air-fuel ratio. The load applied to the engine when the speed of the engine starts to decrease at the previously mentioned conditions is the full load engine torque. Alternatively, the engine may be operated at wide open throttle, a stoichiometric air-fuel ratio, and knock limited spark timing while engine speed is adjusted to the various speeds in the engine speed range. The engine torque output at the various speeds may be described as the full load engine torque over the engine speed range. The speed range of the engine may be from idle speed to a rated or maximum speed of the engine. Full load engine torque values may be determined in this way over the engine speed range. The engine may be operated in a speed control mode when engine torque is adjusted to follow a desired engine speed. Thus, load (e.g., a negative torque) may be applied to the engine to a point where engine speed begins to decline to determine the full load or maximum engine torque. The full load engine torques and their corresponding engine speeds are saved to controller memory. Method 900 proceeds to 906 after a curve representing the full load engine torque is determined.

At 906, method 900 determines full load engine torque at different altitudes over a speed range of the engine. The full load engine torque at different altitudes over the engine speed range may also be described as the maximum engine torque over the engine speed range or the engine torque threshold that is not to be exceeded at different. In one example, the full load engine torque may be empirically determined at a highest altitude the engine is expected to operate via operating the engine in a speed mode and increasing a load applied to the engine until engine speed starts to decrease while engine spark timing is advanced to knock limited spark timing (e.g., spark timing advanced to where engine knock begins) and the engine is operating at a stoichiometric air-fuel ratio. The load applied to the engine when the speed of the engine starts to decrease at the previously mentioned conditions is the full load engine torque at maximum altitude. Alternatively, the engine may be operated at wide open throttle, a stoichiometric air-fuel ratio, and knock limited spark timing while engine speed is adjusted to the various speeds in the engine speed range while the engine is at a maximum altitude it is expected to operate.

The engine torque output at the various speeds may be described as the full load engine torque over the engine speed range at maximum altitude. Additionally, full load engine torques at various engine operating altitudes between sea level and the maximum altitude may be determined in a similar way. The speed range of the engine may be from idle speed to a rated or maximum speed of the engine. Full load engine torque values may be determined in this way over the engine speed range. The engine may be operated in a speed control mode (e.g., engine torque output is varied to maintain a desired engine speed) when engine torque is adjusted to follow a desired engine speed. Thus, load (e.g., a negative torque) may be applied to the engine to a point where engine speed begins to decline to determine the full load or maximum engine torque. The engine may be operating with a fully open throttle in an attempt to maintain engine speed when the load applied to the engine is increased. The full load engine torques and their corresponding engine speeds for each engine altitude are saved to controller memory. Full load engine torques at speeds and altitudes not stored to memory may be interpolated from data stored in memory. Method 900 proceeds to 908 after curves representing the full load engine torque at different engine altitudes are determined.

At 908, method 900 determines full load powertrain torque over the speed range of the powertrain for sea level conditions. Additionally, method 800 determines full load powertrain torque for each altitude up to the maximum engine altitude via adding full load engine torque at an altitude and at a powertrain speed with the full load electric machine torque at the same powertrain speed. This operation is performed for different altitudes between sea level and the maximum engine altitude and for powertrain speeds over the powertrain speed range.

For example, if full load engine torque for sea level at 1000 RPM is 300 N-m and full load electric machine torque at 1000 RPM is 100 N-m, the full load powertrain torque for sea level is 400 N-m at 1000 RPM. If full load engine torque for sea level at 2000 RPM is 350 N-m and full load electric machine torque at 2000 RPM is 100 N-m, the full load powertrain torque for sea level is 450 N-m at 2000 RPM. If full load engine torque for at an altitude of 1000 meters at 1000 RPM is 270 N-m and full load electric machine torque at 1000 RPM is 100 N-m, the full load powertrain torque for 1000 meters is 370 N-m at 1000 RPM. If full load engine torque for 1500 meters at 2000 RPM is 298 N-m and full load electric machine torque at 2000 RPM is 100 N-m, the full load powertrain torque for 1500 meters is 398 N-m at 2000 RPM, and so on. Method 900 proceeds to 910 after determining the full load powertrain torques for sea level.

At 910, method 900 determines a torque inconsistency ratio and an inconsistency of maximum powertrain torque (e.g., full load engine torque plus full load electric machine torque at present vehicle operating conditions) for the present operating conditions (e.g., present powertrain speed (motor/engine speed) and altitude the vehicle and engine are operating at). In one example, the powertrain torque inconsistency ratio may be determined via the previously mentioned equation:

$$r(\omega) = \frac{\text{Mot\_max\_tor}(\omega)}{\text{Eng\_max\_tor}(\omega)}.$$

The inconsistency of maximum powertrain torque may be determined via the previously mentioned equation: $R(\omega)=1+r(\omega)$.

In addition, method 900 limits powertrain torque based on the powertrain torque inconsistency ratio and the inconsistency of maximum or full load powertrain torque. In a first example, $r_0(\omega)$ estimating $$r(\omega) = \frac{\text{Mot\_max\_tor}(\omega)}{\text{Eng\_max\_tor}(\omega)}$$

is held to an empirically determined constant value for all powertrain speeds as mentioned in the description of FIG. 5. The powertrain torque is constrained to $T_{max\_powertrain}(\omega) \leq T_{max\_eng}(\omega)(1+r_0(\omega))$, where the variables are as previously described.

In a second example, $r_0(\omega)$ estimating $$r(\omega) = \frac{\text{Mot\_max\_tor}(\omega)}{\text{Eng\_max\_tor}(\omega)}$$

is held to an empirically determined constant value c for all powertrain speeds, except when $T_{max\_eng}(\omega)*c > \text{Delta\_Trq}$, where c is a constant and where Delta_trq is a maximum electric machine torque (e.g., a threshold electric machine torque not to be exceeded) for electric machine speed less than a threshold. Threshold limited powertrain torque is given by $T_{max\_powertrain}(\omega)$ (e.g., curve 604)$\leq T_{max\_eng}(\omega)(1+r_0(\omega))$ when $T_{max\_eng}(\omega)r_0(\omega) \leq \text{Delta\_Trq}$, where $r_0(\omega)$ is a constant for powertrain speeds (e.g., engine and motor speeds) less than a first threshold speed and greater than a second threshold speed. Conversely, when $T_{max\_eng}(\omega)*c > \text{Delta\_Trq}$ the threshold limited powertrain torque is given by $T_{max\_powertrain}(\omega)$ (e.g., curve 606)$\leq T_{max\_eng}(\omega)(1+r_0(\omega))$, where $r_0(\omega)$ is $\text{Delta\_Trq}/T_{max\_engine}(\omega)$. Such conditions may be present when powertrain speed is between the first threshold speed and the second threshold speed.

In a third example, $r_0(\omega)$ estimating $$r(\omega) = \frac{\text{Mot\_max\_tor}(\omega)}{\text{Eng\_max\_tor}(\omega)}$$

is held to $\text{Delta\_pwr}/(\omega * T_{max\_engine}(\omega))$ if $\text{Delta\_pwr}/(\omega) \leq \text{Delta\_Trq\_max}$, except when $\text{Delta\_pwr}/(\omega) \geq \text{Delta\_Trq\_max}$, then $r_0(\omega) = \text{Delta\_Trq\_max}/T_{max\_engine}(\omega)$. Such conditions may be present when powertrain speed is between the seventh threshold powertrain speed and a ninth threshold powertrain speed. In both cases, the threshold limited powertrain torque is given by $T_{max\_powertrain}(\omega) \leq T_{max\_eng}(\omega)(1+r_0(\omega))$.

The maximum powertrain torque inconsistency is each of the three examples is given by $R(\omega)=1+r_0(\omega)$. As mentioned, the value of r0 has a different basis in each of the three examples. Method 800 limits powertrain torque via limiting engine torque and/or electric machine torque to provide $T_{max\_powertrain}(\omega)$. In one example, vehicle system controller 255 determines the amount of engine torque and electric machine torque to provide $T_{max\_powertrain}(\omega)$. Electric machine torque may be constrained via limiting current flow to the electric machine.

In these ways, powertrain torque may be limited to improve consistency of powertrain output between lower and higher altitudes. Further, the powertrain output limiting may improve powertrain output during conditions where battery state of charge varies. Method 800 proceeds to exit after limiting powertrain output.

Thus, the method of FIG. 9 provides for a powertrain operating method, comprising: receiving sensor input to a controller; and limiting powertrain output via the controller in response to a ratio of a threshold electric machine torque to a threshold engine torque. The method further comprises estimating the ratio of the threshold electric machine torque to the threshold engine torque as a constant value. The method further comprises determining the threshold electric machine torque via operating the electric machine in a speed control mode and applying a torque to the electric machine. The method further comprises determining the threshold engine torque via operating the engine at wide open throttle. The method includes where the threshold electric machine torque is an upper threshold electric machine torque not to be exceeded and the threshold engine torque is an upper threshold limited engine torque. The method includes where limiting powertrain output via the controller includes adjusting current flow to an electric machine. The method further comprises limiting powertrain output to a torque less than the threshold engine torque multiplied by a value of one plus the ratio.

The method of FIG. 9 also provide for a powertrain operating method, comprising: receiving sensor input to a controller; and limiting powertrain output via the controller in response to a threshold engine torque multiplied by a value of one plus a variable, the variable representing a ratio of a threshold electric machine torque to a threshold engine torque. The method further comprises estimating the ratio as a constant value for a range of powertrain speeds. The method further comprises estimating the ratio as a constant value for a range of powertrain speeds and bounding the threshold engine torque multiplied by the variable to less than an empirically determined torque limit.

In some examples, the method further comprises estimating the ratio as an empirically determined powertrain power divided by powertrain speed multiplied by a threshold limited engine torque at the present powertrain speed. The method includes where the threshold electric machine torque is an upper threshold electric machine torque not to be exceeded and the threshold engine torque is an upper threshold limited engine torque. The method includes where limiting powertrain output via the controller includes adjusting current flow to an electric machine. The method further comprises determining the threshold engine torque via operating the engine at wide open throttle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed or omitted depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A powertrain operating method, comprising:
receiving sensor input to a controller;
limiting powertrain output to a torque value less than a maximum powertrain output torque via the controller adjusting current flow to an electric machine in response to a threshold engine torque multiplied by a value of one plus a variable, the variable representing a ratio of a threshold electric machine torque to a threshold engine torque; and
estimating the ratio as an empirically determined powertrain power divided by powertrain speed multiplied by a threshold limited engine torque at a present powertrain speed.

2. A system, comprising:
an engine;
an electric machine coupled to the engine;
a transmission coupled to the electric machine; and
a vehicle system controller including executable instructions stored in non-transitory memory to constrain powertrain torque via adjusting current flow to the electric machine in response to an estimate of powertrain torque inconsistency, the powertrain torque inconsistency equal to a value of one plus a ratio, where the ratio is estimated as an empirically determined threshold power divided by a threshold engine torque.

3. The system of claim 2, further comprising estimating the ratio as a constant value for all powertrain speeds.

4. The system of claim 2, further comprising constraining the powertrain torque to a value less than the threshold engine torque multiplied by the estimate of powertrain torque inconsistency.

5. The system of claim 2, where the ratio includes the threshold engine torque in its denominator, and further comprising multiplying the threshold engine torque by a present powertrain speed in the denominator of the ratio.

* * * * *